US007139837B1

(12) United States Patent
Parekh et al.

(10) Patent No.: US 7,139,837 B1
(45) Date of Patent: Nov. 21, 2006

(54) RULE ENGINE

(75) Inventors: Pankaj Parekh, Fremont, CA (US); Sandeep Gupta, Delhi (IN); Vijay Mamtani, New Delhi (IN)

(73) Assignee: iPolicy Networks, Inc., Fremont, CA (US)

( * ) Notice: Subject to any disclaimer, the term of this patent is extended or adjusted under 35 U.S.C. 154(b) by 753 days.

(21) Appl. No.: 10/264,803

(22) Filed: Oct. 4, 2002

(51) Int. Cl.
*G06F 15/173* (2006.01)

(52) U.S. Cl. ...................................... 709/238; 709/239

(58) Field of Classification Search ................ 709/238, 709/239
See application file for complete search history.

(56) References Cited

U.S. PATENT DOCUMENTS 5,521,910 A * 5/1996 Matthews .................. 370/256
6,484,261 B1 * 11/2002 Wiegel ........................ 726/11
2001/0045914 A1 * 11/2001 Bunker ....................... 343/895
2002/0042274 A1 * 4/2002 Ades .......................... 455/445
2004/0034848 A1 * 2/2004 Moore et al. ............... 717/117

* cited by examiner

*Primary Examiner*—Jason Cardone
*Assistant Examiner*—Minh-Chau Nguyen
(74) *Attorney, Agent, or Firm*—William L. Botjer

(57) ABSTRACT

A rule engine for a computer network traverses a rule mesh having path nodes and path edges in form of a tree part and a graph part. The rule engine evaluates data packets flowing through a network to determine rules matched for every packet. Subsequent packets having same expression values as an already checked packet are not rechecked against the same nodes in the rule mesh through the use of a session entry. The rule engine performs a search on every path node of rule mesh to determine the next path edge to traverse. A Tree-Id and Rule Confirmation Bitmap that are indicative of path traversed and rules matched by a packet are generated at the end of rule mesh traversal. These are appended in the packet extension for subsequent modules of Policy Agent.

14 Claims, 7 Drawing Sheets

| Expression Category Change | | Rule Engine Action | | No Processing Flag |
|---|---|---|---|---|
| P1 Category | P2 Category | Control Set | Data Set | No Processing Flag |
| Session | Session | No Action | No Action | No Action |
| Session | Control | Update | No Action | No Action |
| Session | Data | Update | Update | No Action |
| Session | Traversal Over | Set as Null | Set as Null | Set |
| Control | Control | No Action | No Action | No Action |
| Control | Data | No Action | Update | No Action |
| Control | Traversal Over | No Action | Update | Set |
| Data | Data | No Action | No Action | No Action |
| Data | Traversal Over | No Action | No Action | Reset |

FIG. 5

| | |
|---|---|
| e | 3 |
| d | 2 |
| l | 1 |
| o | 1 |
| h | 4 |
| s | 5 |
| w | 5 |
| a | 4 |
| i | 4 |
| u | 2 |
| n | 3 |
| t | 1 |

FIG. 6

RULE ENGINE

BACKGROUND

The invention relates to integrated policy enforcement systems for computer networks. In particular the invention provides a method and system for evaluating data packets against configured rules and mapping the packets to the rules that have matched for an integrated policy enforcement system.

The emergence and advancement of networks and networking technologies has revolutionized information exchange between organizations. A network may be defined as a group of computers and associated devices that are connected via communication links. These communication links can be wireless communication links. All the devices connected over a network are capable of communicating (i.e. sending and receiving information) with other devices connected to the network.

A network can range from one that connects a few devices in a single office to one that spans continents and connects several thousand computers and associated devices. Networks are generally classified as Local Area Networks (LANs) and Wide Area Networks (WANs) based on the geographic area they cover. A LAN is a network connecting servers, computers and associated devices within a small geographic area. LANs are widely used to connect servers, computers and devices in organizations to exchange information. A WAN is a network that links at least two LANs, which are spread over a wide geographic area. A network of an organization connecting devices and resources of the organization is called an intranet. The devices and resources in an intranet may be connected over a LAN or WAN. The globally interlinked collection of LANs, WANs and intranets is called Internet. The Internet can thus be called a network of networks. The Internet allows exchange of information between LANs, WANs and intranets that are connected to it.

Most organizations link their intranets with the Internet to allow information exchange with different organizations. Information exchange involves transfer of data packets. Organizations allow legitimate users on the Internet to access their intranets for information exchange. Legitimate users are people outside the organization who have authorization from the organization to access its intranet. Such information exchange poses a security risk as the organization's intranet becomes accessible to outsiders. Illegitimate users can change data, gain unauthorized access to data, destroy data, or make unauthorized use of computer resources. These security issues require organizations to implement safeguards that ensure security of their networks.

Various solutions are available to deal with such security issues. Most of these solutions implement a security policy on network traffic to address security concerns and are known as 'policy enforcement systems'. Network traffic comprises data packets flowing through the network. The policy comprises a set of rules that checks data packets flowing though the network for irregularities. The rules comprise conditions that are checked based on properties of data packets. Based on this check, the security solution regulates network traffic.

One of the commonly used security solutions that implement a policy is a firewall. Firewalls are installed between an organization's intranet and the Internet. Firewalls, being policy-based security devices, selectively allow or disallow data packets from entering or leaving the organization's intranet.

Firewalls inspect each data packet entering or leaving the intranet against a set of rules. Hence, the performance of a firewall suffers with an increase in the number of rules, because each data packet has to be checked against an increased number of rules. This decreases the number of packets that the firewall can process per unit time. Moreover, an increase in the volume of network traffic increases the number of packets that have to be checked against the rules per unit time. Due to these limitations, conventional firewall systems are capable of implementing only a limited number of rules and can handle only a limited volume of network traffic.

An effort to overcome these problems has been made by US Patent Application No. US 2002/0032773 assigned to SERVGATE Technology, Inc. and titled "System, method and computer software product for network firewall fast policy lookup". The patent application describes a system and method for faster rule lookup. The method described in the patent application improves the speed of rule lookup in firewalls. Firewalls store all the rules against which the data packets passing though the firewall have to be checked. For implementing security, firewalls perform a table lookup, which involves validating a data packet against rules defined in the policy table. The patent application describes a method that allows for faster rule lookup than conventional firewall systems. This is achieved by simplifying the table lookup process.

Though, most networks are protected by firewalls but firewalls do not provide a complete security solution. This is because firewalls can be circumvented through various techniques such as "tunneling" and "back doors". Moreover, a firewall alone cannot provide information regarding any attack that is successfully repelled. Such information can be used to block future such attacks. Intrusion Detection Systems (IDS) are thus used as a protection against such attempts to exploit the devices connected over the network.

Intrusion Detection Systems adopt either a network or a host based approach to recognize and stop attacks. In both cases, the IDS looks for attack signatures. Attack signatures are patterns that indicate any harmful intent. If an IDS checks for such patterns in network traffic, then it is said to be following a network-based approach. Whereas, if an IDS searches for attack signatures in log files then it is said to be following a host based approach. Log files contain records of events and activities taking place at individual computers and associated devices. If an attack is detected, the IDS may take corrective measures like administrator notification and connection termination.

Network-based IDS is essentially used for detecting attacks that emanate from outside the organization's intranet. Typically, network-based IDS use two approaches to analyze the network traffic, viz. pattern matching and anomaly detection. Pattern matching involves comparison of network traffic with signatures of known attacks. These signatures are generally stored in a database and serve as a basis of comparison with the network traffic. In anomaly detection, the IDS checks for any unusual activity in the network traffic. An unusual activity is defined as one that deviates to a large extent from the normal state of the network traffic. In case IDS finds any such activity, it generates an alert such as administrator notification.

The above-mentioned security systems may be deployed by Internet Service Providers (ISPs) to ensure safety of their customer's intranets. ISPs provide these security services to their customers in addition to various other services like 'Quality of Service'. 'Quality of Service' refers to the ability of an ISP to provide a customer with the best available services based on the terms and conditions of their agreement. The ISPs need to implement policies in order to take a decision for the same.

The above-mentioned policy enforcement systems have some inherent advantages. For ISPs and big organizations it becomes necessary to integrate two or more of the above systems to provide enhanced security and services. For example, an organization may like to have network-based IDS behind a firewall. This configuration will provide enhanced security as it would raise an alert in case of incoming network packets that may have circumvented the firewall. Thus, integrated systems have the potential of offering enhanced security.

An effort in this direction has been made by U.S. Pat. No. 5,996,077 assigned to Cylink Corporation, of Sunnyvale, Calif., USA, and titled "Access control system and method using hierarchical arrangement of security devices". The patent describes a system and method for coupling two or more security devices to create an integrated security system that offers enhanced security. The integrated security system is installed between the intranet of an organization and the Internet and receives network traffic consisting of data packets. These data packets are passed through a plurality of security devices that have rules of descending strictness. The first security device receives the data packet and tries to process it by using security rules defined for the first device. If the first security device is not able to process the packet then the packet is passed to the second security device for possible processing using security rules defined for the second device. The process of passing the data packet to the next security device is repeated until the data packet is processed or until the last security device passes the data packet as unprocessed. This system requires a plurality of security devices to have rules of descending strictness. Moreover, processing of data packets by every security device involves rechecking of some conditions defined in the rules. This is because some conditions that were already checked may be rechecked again when the data packet passes through subsequent security devices. This reprocessing will make the above system inefficient if there are a large number of policies to be implemented or if the volume of network traffic increases.

In light of the foregoing, what is required is a network security system that offers the capability of integrating two or more security devices to offer enhanced security. The system should also be capable of implementing a large number of rules over a large volume of network traffic without adversely affecting its performance.

SUMMARY

An object of the present invention is to perform traversal of a rule mesh for checking packets against nodes in the rule mesh; the nodes signifying rules or parts of configured rules.

Another object of the present invention is to provide information for every packet regarding rules matched by each packet.

Still another object of the present invention is to improve efficiency of rule mesh traversal for subsequent packets of a session by ensuring that subsequent packets having same expression values as an already checked packet are not rechecked against same nodes.

Yet another object of the present invention is to resume path traversal from any intermediate node of the rule mesh, for most of the packets on the Internet to gain in performance.

A rule engine traverses a rule mesh having path nodes and path edges arranged in form of a tree part and a graph part. The rule engine evaluates packets flowing through a network to determine rules matched for every packet. The rule engine flags a node in the rule mesh for subsequent packets of a session to start traversal from this flagged node. The information regarding flagged node is stored in a session entry. Subsequent packets having same expression values as an already checked packet are not rechecked against the same nodes in the rule mesh. This is achieved through the use of this information stored in session entry. The rule engine while traversing the rule mesh for a packet performs a search on every path node to determine the next path edge to traverse. The path edge leads to another path node where the process of search is repeated. The rule mesh consists of rule tree on the top followed by the rule graph at the leaf edge of each rule tree. At the end of tree traversal a Tree-Id is collected and Rule Confirmation Bitmap (RCB) and Graph Traversal Bitmap (GTB) are initialized for subsequent traversal of the graph. The values of RCB and GTB are computed at every path edge during graph traversal. During graph traversal, RCB gets formed into a bitmap that indicates the rules confirmed or matched amongst the pending rules in the graph, while GTB degenerates to NULL as all pending rules get either eliminated or confirmed into RCB. The Tree-Id and RCB generated at the end of rule mesh traversal are indicative of path traversed and rules matched by a packet. The Tree-Id and RCB together are referred to as rule lookup-Id. These are appended in the packet extension for subsequent modules of integrated policy enforcement system.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 5 is a table illustrating actions that the rule engine may perform for change in expression categories of two consecutive path nodes P1 and P2.

FIG. 6 is a table illustrating skip value computed using a configured pattern match search algorithm.

DESCRIPTION OF PREFERRED EMBODIMENTS

Definitions

Figure 1:
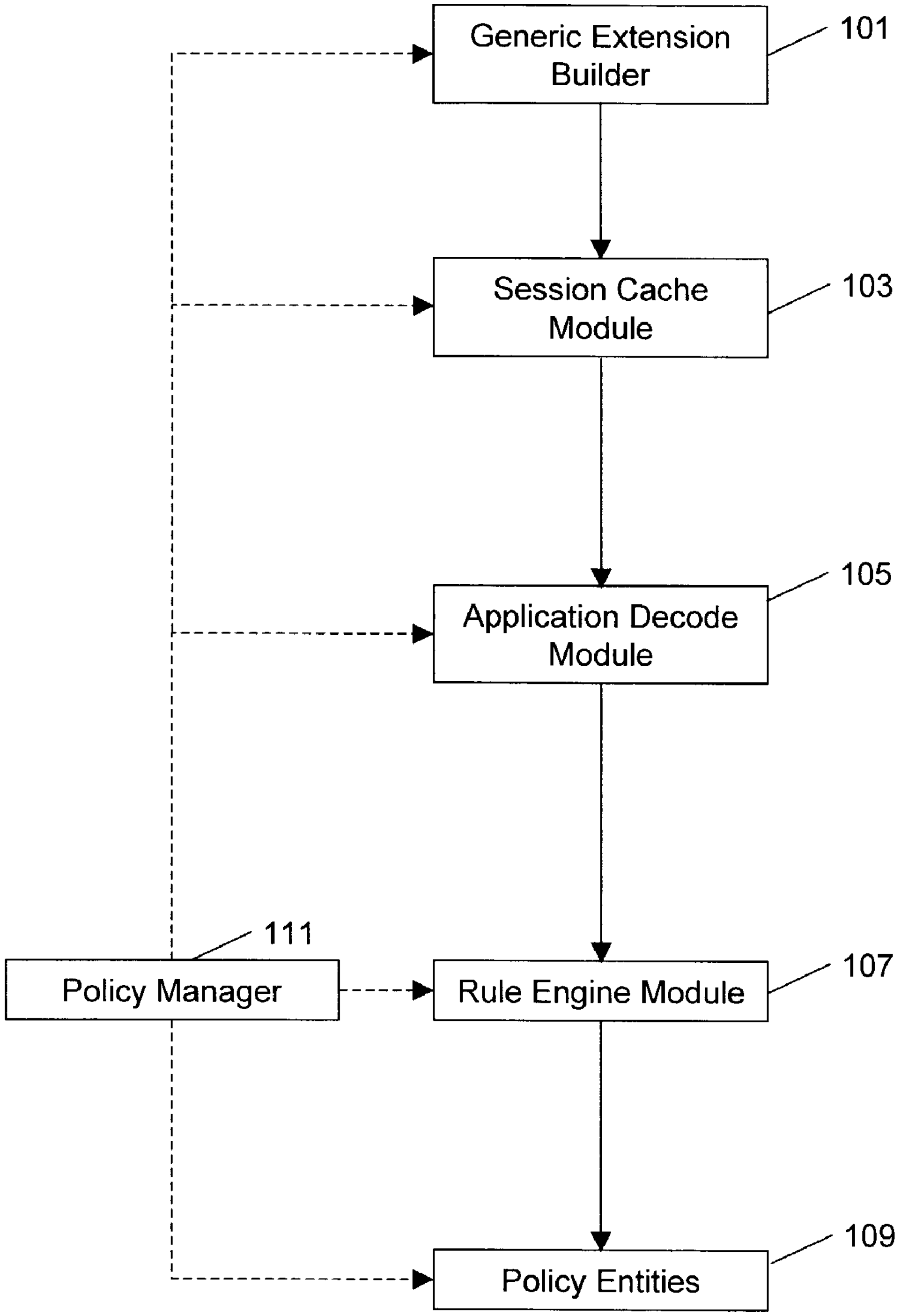
FIG. 1 is a schematic diagram that illustrates the functional modules of an exemplary Policy Agent.

Data packets: This term refers to units of data that are sent on any packet-switched network or the like, and encompasses Transmission Control Protocol/Internet Protocol (TCP/IP) packets, User Datagram Protocol (UDP) packets, which may also be referred to as datagrams, or any other such units of data.

Expression: An expression denotes a property of network traffic whose value determines the outcome of a condition. Examples of expressions include source IP address, destination IP address, and layer 3 protocols.

Rule mesh: A data structure, which is a combination of two types of data structures namely, tree and graph. The data structure starts as a tree, the leaf nodes of tree end into a graph.

Tree data structure: A tree data structure is a data structure comprising nodes and edges. A node can be root node, leaf node or an internal node. The root node is the starting node of a tree. There is only one root node in a tree. On traversing the tree from top to bottom, the root node is the first node encountered. The tree starts from a root node and ends at leaf nodes. Nodes other than root node and leaf nodes are termed internal nodes. An Internal node has one or more child nodes and is called the parent of its child nodes. All children of the same node are siblings. In a tree only one path exists between two nodes.

Graph data structure: A graph data structure is a data structure comprising vertices and edges. The vertices of the graph are equivalent to nodes of a tree and are connected via edges. In a graph, there can be multiple paths between two vertices. Tree-graph: This refers to a data structure, which is a combination of two types of data structures namely, tree and graph. The tree-graph data structure starts as a tree. The tree ends at tree leafs, from where the graphs start Path node: A path node refers to a node in the rule mesh. The rule engine starts traversal from a root path node and takes a path edge based on the result of the search done on the path node. The path edge leads the rule engine to the next path node, where "search and jump to next path node" operation is repeated.

Path edge: A path edge is an edge that starts from a path node and leads to the next path node. A path edge may lead to a tree node or to a graph node.

Matched rules in tree: A rule may get matched in the tree part of the expression tree-graph, also referred to as the rule mesh. An edge of a tree gives the rules that have matched as a result of reaching that part of the tree. For the rule engine, a leaf of the tree, which is also the start of the graph, gives all the rules that have matched in the tree leading to the start of graph.

Pending rules in graph: On the edge of a tree few rules have got matched within the tree, while few others would get matched in the graph below. The rules that would get matched or decided in the graph are grouped in a set of pending rules. In the graph, a few rules out of the pending list of rules may match and few others may get eliminated.

Start of graph: The start of graph is the first node of the graph. A leaf tree edge always leads to the start of graph. The start of graph gives the 'pending rules in graph'. The leaf edge gives the Tree-Id.

The present invention is a system and method for evaluating packets against configured rules and mapping the packets to the rules that have matched.

The present invention is envisaged to be operating within an integrated policy enforcement system hereinafter referred to as Policy Agent. The policy agent may be embodied in a product such as the ipEnforcer 5000® as provided by iPolicy Networks Inc. of Fremont, Calif. This product is used to enforce management policies on networks, and is placed at a point where packets enter a network. Further, the policy agent may be encoded in a programming language such as C or Assembly.

The Policy Agent scans packets as they pass through it, and enforces network policies on these packets. Although the Policy Agent may be variously provided, a description of one such Policy Agent can be found in U.S. patent application Ser. No. 10/052,745 filed on Jan. 17, 2002, and titled "Architecture for an Integrated Policy Enforcement System"; the entire contents of which are hereby incorporated by reference. However, it may be noted that the present invention may be adapted to operate in other Policy Agents by one skilled in the art.

FIG. 1 is a schematic diagram that illustrates the functional modules of an exemplary Policy Agent. Referring to FIG. 1, the various functional modules of the Policy Agent are Generic Extension Builder 101, Session Cache Module 103, Application Decode Module 105, Rule Engine Module 107 and Policy Entities 109. The Policy Agent is also supported by a Policy Manager 111. A packet entering the Policy Agent travels through these functional modules. Each functional module appends its output to extensions in the packet, which are then used by subsequent modules of the Policy Agent.

Generic Extension Builder 101 processes the packet headers for information related to Open Systems Interconnection (OSI) Layer 2 and Layer 3.

Session Cache Module 103 processes the packet headers for information related to OSI Layer 4 and layers above it.

Application Decode Module 105 identifies the application generating the packet and tracks the packet as it transitions from one application state to another.

Rule Engine Module 107 makes policy decisions based on the information gathered from the previous modules. It identifies rules matched by a packet, and passes this information to Policy Entities 109.

Policy Entities 109 comprises policy-processing modules, which are also referred to as Service Application Modules (SAMs). These modules analyze the packet further according to its requirements and enforce policies. SAMs include, but are not limited to, Firewall modules, Intrusion Detection System (IDS) modules and Virtual Private Network (VPN) modules.

Policy Manager 111 comprises policy rules, which are implemented by the Policy Agent.

Figure 2:
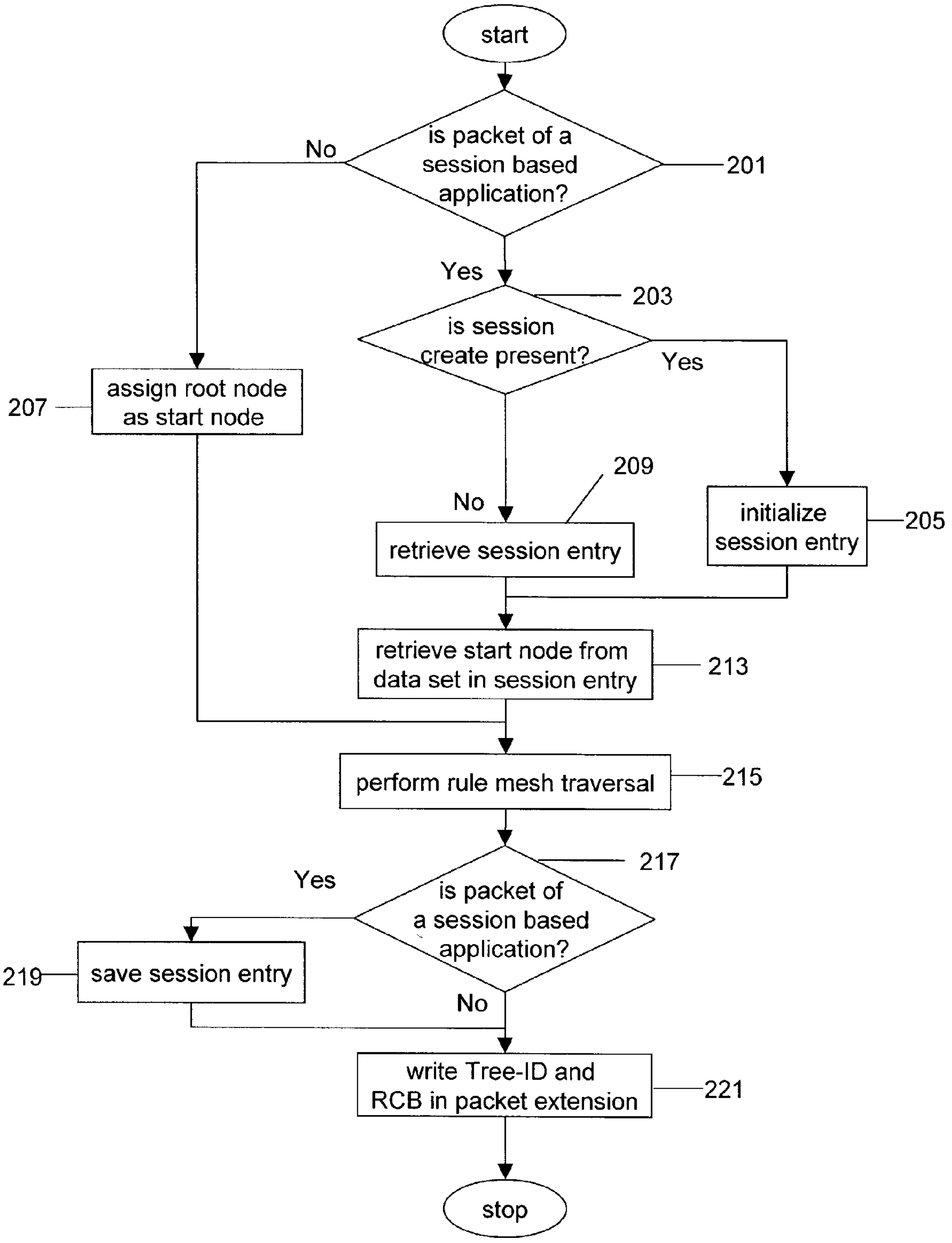
FIG. 2 is a flowchart illustrating a method for processing of packets by a Rule Engine Module.

FIG. 2 illustrates the method for processing of packets by Rule Engine Module 107.

The rule engine traverses a rule mesh for evaluating a stream of packets flowing through a network against rules configured in the rule mesh. The rule mesh is generated by a rule compiler. The structure and creation of the rule mesh have been described in co-pending U.S. patent application Ser. No. 10/264,889 titled 'Rule compiler for computer network policy enforcement systems', the disclosure of which is hereby incorporated by reference. The rule mesh is a combination of tree and graph data structures. It would be evident to a person skilled in the art that this design enables striking of a balance between execution speed afforded by a tree data structure, and memory space saving provided by a graph data structure. Further, it would also be evident to a person skilled in the art that there can be numerous other data structures that may be employed.

The rule mesh is a combination of path nodes and path edges. A path node denotes an expression against which a packet is checked. Based on such a check, a path edge is chosen for traversal. Each leaf level path edge of the tree part of the rule mesh leads into a graph. The graph consists of path nodes and path edges arranged as a mesh instead of a tree. The rule engine traverses these path nodes and path edges to reach the end of the rule mesh traversal. The traversal of the rule mesh for every packet generates a rule lookup-Id for the given packet. The rule lookup-Id is used to indicate the rules matched by a packet during rule mesh traversal. The rule lookup-Id is populated in a packet extension and travels along with the packet to other modules of the Policy Agent.

The rule engine starts traversal of the rule mesh from a path node referred to as a root path node. The rule engine begins traversal of the tree data structure starting from the root path node. The tree traversal continues till the rule engine arrives at a 'start of graph' path node. During tree traversal, the rule engine performs a search at each path node. Every path node specifies the search to be performed to determine a path edge. This path edge leads the rule engine to the next path node against which the packet should be evaluated. A rule may get matched in the tree part of the rule mesh. An edge of a tree gives the rules that have matched so far. A leaf edge of the tree, which leads to a 'start of the graph' path node, gives all the rules that have matched for a given packet within the tree part of rule mesh. When the rule engine arrives at a path node that signals 'start of graph', the tree traversal terminates. At this stage the rule engine collects a 'Tree-Id' from the path edge that leads it to the 'start of graph' path node.

The 'start of graph' path node is the first node of the graph. A tree leaf edge always leads to a 'start of graph' path node. The 'start of graph' gives the 'pending rules in graph'. At the leaf edge of a tree the packet being evaluated may have matched few rules within the tree, while few other rules remain pending against which the packet needs to be checked. The packet is checked against these pending rules in the graph that are grouped in a set of pending rules.

The graph traversal starts at a 'start of graph' path node and continues till the end of rule mesh traversal. The rule engine traverses the rule mesh till at least one of the conditions governing end of rule mesh traversal are satisfied. These conditions governing end of rule mesh traversal are described in detail later. All throughout the graph traversal, the rule engine maintains two bitmaps: namely, a Rule Confirmation Bitmap (RCB) and a Graph Traversal Bitmap (GTB). On every path node within the graph (hereinafter referred to as a graph node), the rule engine determines the next path edge by doing a search specified at each graph node. Further, each graph edge comprises two bitmaps, namely: a Confirmation Bitmap (CB) and an Elimination Bitmap (EB). As the rule engine arrives at a graph edge, it re-computes values of RCB and GTB based on occurring values of RCB and GTB and values of CB and EB for the particular path edge arrived at. In this way, a path edge leads the rule engine along with the new values of RCB and GTB to the next path node against which a packet is to be evaluated. The graph traversal ends when a condition governing the end of rule mesh traversal is satisfied.

The nodes in the rule mesh represent different expressions supported. The different expressions supported fall into three different expression categories namely: session-based, control-based and data-based.

A session-based expression is one, whose value remains the same for all packets of a session such as a TCP based session or a UDP based session. Each packet of an application based on TCP or UDP (referred to as the packets of the session) is characterized by a set comprising the source and destination IP addresses, source and destination port numbers and Layer-4 protocol value. All values related to these expressions remain constant and do not change for different packets of a session. Therefore, once these values have been evaluated for a given packet of a session, they need not be evaluated again for subsequent packets of the same session.

A control-based expression is one, whose value changes rarely for different packets of a session. The expressions related to higher-level application transactions and the application parameters fall into the category of control-based expressions. For example, the FTP session enters a GET transaction state, when a FTP client sends a 'GET' message to the FTP server. Thereafter many packets are transacted between the FTP client and server as part of the FTP GET transaction processing. Therefore, the value of FTP_Tx for all these packets of the session remains 'GET'. However, after 'GET', the client might send a 'PUT' transaction to the FTP server. At this point, the value of the expression FTP_Tx changes from 'GET' to 'PUT'.

Any change in value of control-based expression category for a stream of packets, is indicated to the rule engine, through a control signal from the Application Decode Module 105. The Application Decode Module is described in co-pending U.S. patent application Ser. No. 10/264,971, titled 'Application Decoding Engine for Computer Networks', the disclosure of which is hereby incorporated by reference. The action performed by the rule engine on receiving a signal from Application Decode Module is explained in detail in FIG. 4. As mentioned, the session-based expressions need to be evaluated only for a given packet of a session and all other packets of the same session are not required to be re-evaluated. Similarly, the control-based expressions need to be evaluated only for first packet of every session received after having received a control signal from the Application Decode Module.

The data-based expressions are those, whose value may change for each packet of a session. They need to be evaluated for each packet of a session.

In a preferred embodiment of the present invention, expressions such as packet direction and time are treated as session based expressions. Generally, packet direction and time are data based expressions and need to be evaluated for every packet of a session. However, in a preferred embodiment of the present invention the Rule Engine Module maintains two separate positions for start of traversal of the rule mesh, one for the incoming packet direction and another for the outgoing packet direction. Thus, 'packet direction' expression can be treated as a session-based expression. The value of the expression would not change for all packets of a session flowing in the same direction. Also, according to a preferred embodiment of the present invention, a session receives the same treatment determined by the time when the session started, irrespective of the time change while the session is in progress.

Referring again to the Rule Compiler Module, during compilation weights are assigned to different expressions based on certain criteria. Amongst these criteria, the one that carries the maximum weight-age is the category of a session. A session-based expression always has a higher weight-age than control-based expressions, which in turn have higher weight-age than data-based expressions. The Rule Compiler Module ensures that nodes denoting session-based expressions (session-based nodes) appear on top of rule mesh; followed by the nodes denoting control-based expressions (control-based nodes); and lastly the nodes denoting data-based expressions (data-based nodes) are placed. Thus, when the rule engine traverses rule mesh, it first encounters session-based expressions. As it traverses along the rule mesh, the rule engine encounters control-based expressions and lastly it comes across data-based expressions. This structuring of the rule mesh eliminates the need to evaluate subsequent packets of a session that have the same expression value as an already evaluated packet, for same nodes, against which the latter has been evaluated.

Referring to FIG. 2, at step 201, a check is made in the packet extension to determine if the packet belongs to a session based application such as one based on TCP or UDP. The Session Cache Module 103 adds information in the packet extension identifying a packet as a packet of a session based application. Session Cache Module 103 also appends a session flag and other session related static information in the packet extension of each packet of a session based application. The session flag may take different values, for e.g. SC_CREATE (a packet carrying this flag creates the session and is the first packet of a session), SC_SETUP (a packet carrying this flag is a normal packet in the middle of a session), and SC_CLOSE (a packet carrying this flag is the final packet of a session and closes a session). A Session Cache Module is described in co-pending U.S. application Ser. No. 10/052,745 titled "Architecture for an Integrated Policy Enforcement System". The Session Cache Module 103 thus maps a packet received to a session. The Session Cache Module 103 appends session information to the packet extension that indicates if a packet is that of a session based application (like those based on TCP or UDP) or a packet of other applications i.e. non-session based application. Although, according to the preferred embodiment, the Policy Agent treats packets of a TCP or UDP based application as packets of a session based application and performs session based optimization for such packets, it would be evident to one skilled in the art that optimization for packets of applications that are based on other Level 4 protocols can also be achieved. Further, the Session Cache Module 103 maintains a session cache, which contains the data for all active sessions in the Policy Agent. The mapping of packet to a session lends enhanced performance to rest of the modules, as in many cases all packets of a session are given the same treatment. The Session Cache Module 103 updates the packet extension with the session flag and all the other data that is static for the session.

At step 203, a check is made to determine the presence of session create in a packet. Session create is a flag that is carried in the packet extension of the first packet of a session based application such as a TCP or UDP based application.

If session create is present, then at step 205, a session entry is initialized. The Session Cache Module 103 creates the session entry. Presence of session create flag denotes that the packet is first packet of a session based application. A session entry stores key elements that are used to resume path traversal from any intermediate node of the rule mesh. The session entry contains one set of these key elements for each direction of the session, i.e. incoming and outgoing directions. Further, the session entry contains a data set and a control set for each direction, i.e. incoming and outgoing directions. Data set indicates the position from where the traversal needs to start for all packets of a session, while the control set indicates the position from where the traversal should start after the rule engine receives a control signal from the Application Decode Module 105. The action on receiving a control signal is described later in FIG. 4 in detail.

Initialization of session entry involves initializing control and data sets of the session entry, for both incoming and outgoing directions, to point to a root node.

In a preferred embodiment of the present invention, the data and control sets for each direction comprise values for a start path node, a Tree-Id, RCB and GTB.

A start path node is the node from where a packet starts traversal of the rule mesh.

A Tree-Id is a value that represents a unique Id for a given tree leaf edge.

RCB is a bitmap that the rule engine updates while traversing the graph. Each bit represents a rule from the set of 'pending rules in graph'. A bit in this bitmap gets set, if the rule is matched in the graph.

GTB is a bitmap that the rule engine updates while traversing the graph. Each bit represents a rule from the set of 'pending rules in graph'. The rule engine stops traversal of rule mesh when this bitmap becomes zero.

The rule engine, therefore stores four sets of the above mentioned variables in each session entry maintained by it.

The rule engine updates the control and data sets in the session entry, while doing rule mesh traversal. As the rule engine traverses through the rule mesh, passing from one path node to another, it encounters a change in the expression category of the path nodes. Two consecutive path nodes, say P1 and P2, may have same or different expression categories. The actions that the rule engine may perform for all possible combination of expressions are shown in FIG. 5.

Referring to step 205, after the session entry has been initialized, at step 213 the rule engine retrieves start node from data set in the session entry. In case of first packet of a session based application, which carries a session create flag, the session entry is initialized to point to the root node. This is done by initializing the data set in the session entry to point to the root node. Thus, the session create packet starts traversal from root node.

Referring to step 203, if it is found that the packet does not carry a session create flag, then at step 209 the session entry is retrieved. The session entry is saved in a memory, from where it is retrieved. The absence of a session create flag indicates that the packet is a not the first packet of a session based application. Thereafter, at step 213, the rule engine retrieves the node for start of traversal from the data set of the session entry and continues traversal from the node retrieved. Thus, subsequent packets of a session based application start traversal from the start node retrieved from the data set of the session entry.

Again referring to step 201, if the packet is not that of a session based application, which implies that the packet is not a TCP or UDP based packet, then at step 207, a root node is assigned as the node for start of traversal for this packet. For all packets, not having a session flag i.e. non-session based applications; the root node is assigned as the start node. By way of an example, all packets of applications based on ICMP or IGMP start traversal from the root node.

Once the rule engine knows the start path node for a packet of a session, it proceeds with rule mesh traversal at step 215. Subsequently, at step 217, a check is again made to determine whether the packet is that of a session based application. If the session flag is present denoting that the packet is a session based application packet, then, at step 219, node for start of traversal for subsequent packets is saved in the session entry. Following which, at step 221, the rule lookup-Id, which comprises the Tree-Id and RCB is appended to the packet extension. This rule lookup-Id is used by the SAMs to determine the actions they need to take corresponding to the rules that have matched for the individual SAMs. In a preferred embodiment of the present invention, a rule lookup table is used by rule lookup macros of individual SAMs. Each SAM contains one rule lookup table. This table is indexed using the Tree-Id and then the rule lookup macro traverses through the rule lookup table using the RCB to find matching rules.

Referring again to step 217, in case the packet is not that of a session based application then the rule lookup-Id is appended to the packet extension at step 221.

Figure 3:
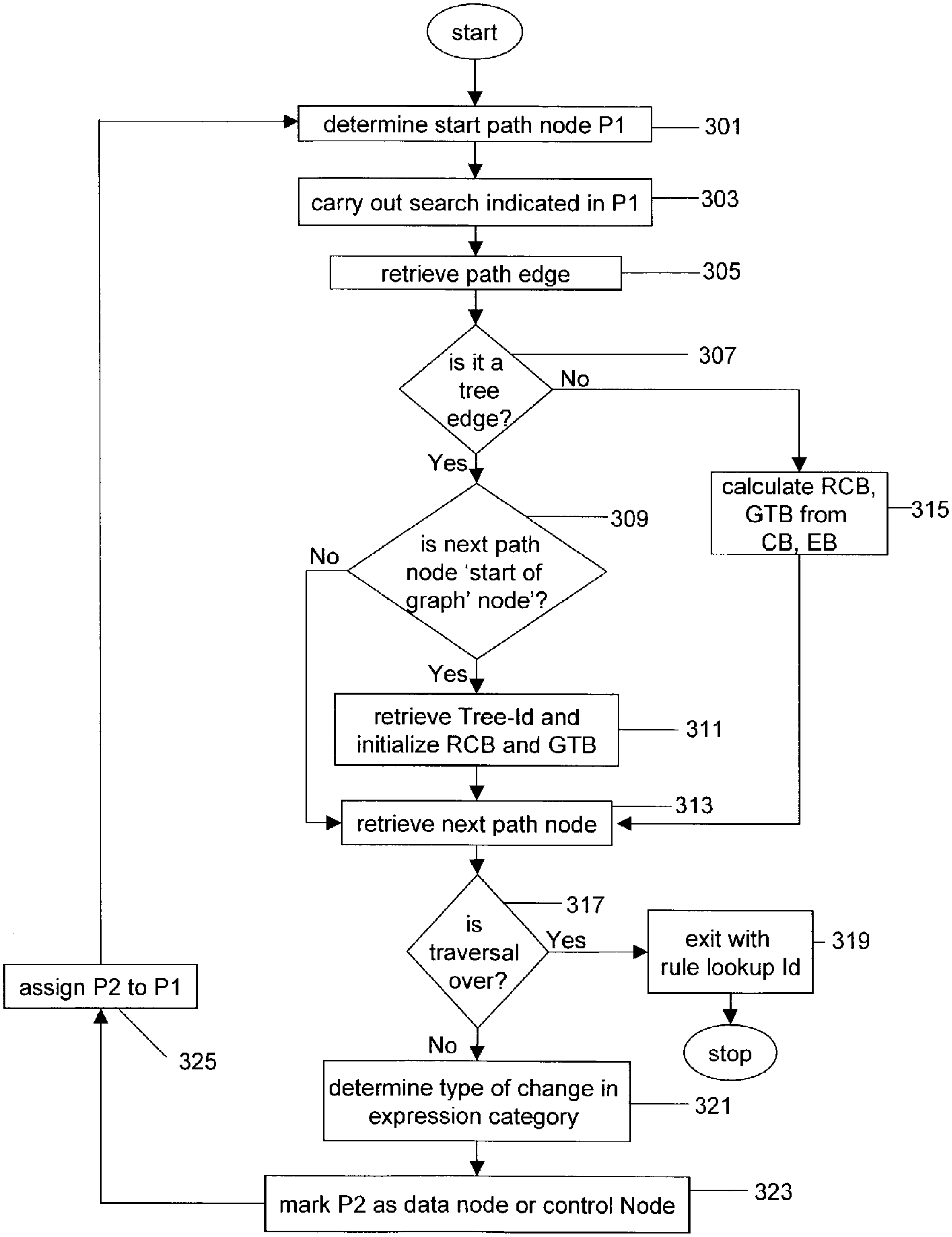
FIG. 3 is a flowchart illustrating steps involved in rule mesh traversal.

FIG. 3 illustrates rule mesh traversal. At step 301, the start node (P1) for traversal is determined. Step 301 of determining start node may involve either step 213 of retrieving start node from session entry or step 207 of assigning start node as root node, as have been elaborated in FIG. 2.

At step 303, the search indicated in P1 is carried out to determine a path edge for traversal.

At step 305, the path edge, determined in previous step, is retrieved from a path edge table. A path edge table stores the different tree and graph edges of the rule mesh. Each path node of the rule mesh stores the location into the path edge table, where the edge entries for that path node start.

At step 307, a check is made whether the path edge retrieved is a tree edge. If the path edge is a tree edge then at step 309 a check is made whether the path node retrieved from the path node table is a 'start of graph' path node. If it is a 'start of graph' path node, then at step 311, the rule engine retrieves a Tree-Id from the tree path edge that leads to 'start of graph' path node. The rule engine also initializes an RCB and GTB to predefined values.

Subsequently, at step 313, the rule engine retrieves the index of next path node from the path edge. The index of the next path node is used to retrieve the path node from the path node table.

If the path node retrieved at step 309 is not a 'start of graph' path node, then at step 313, the rule engine retrieves the next path node from the path node table.

Referring back to step 307, if the path edge retrieved from the path edge table is not a tree edge, then at step 315, RCB and GTB are computed from a Confirmation Bitmap (CB) and an Elimination Bitmap (EB).

CB is a bitmap maintained within a graph edge. Each bit in it represents a rule from the set of 'pending rules in graph'. A bit in this bitmap is set for a graph edge, if taking that edge confirms a rule from the pending set.

EB is a bitmap maintained within a graph edge. Each bit in the EB represents a rule from the set of 'pending rules in graph'. A bit in this bitmap is set if the rule is eliminated as a result of taking that edge.

The rule compiler computes and populates CB and EB on each graph edge. This is explained in detail in co-pending U.S. patent application Ser. No. 10/264,889 titled 'Rule compiler for computer network policy enforcement systems', the disclosure of which is hereby incorporated by reference.

As the rule engine arrives at a graph edge, it re-computes values of RCB and GTB based on occurring values of RCB and GTB and values of CB and EB for the particular path edge arrived at. In this way, a path edge leads the rule engine along with the new values of RCB and GTB to the next path node against which a packet is to be evaluated.

In a preferred embodiment of the present invention, RCB and GTB are calculated according to the following formula:

$$RCB=(RCB|CB)\&(RCB|GTB)$$

$$GTB=GTB\&EB$$

After retrieving the next path node (P2), at step 317, a check is made whether end of rule traversal is reached. The end of rule traversal is reached if conditions governing end of traversal are satisfied.

Conditions governing end of traversal are satisfied when either of the following occurs: either the value of GTB is zero or the next path node retrieved is NULL.

If the rule mesh traversal is over, then at step 319, the packet extension is appended with the rule lookup-Id, which is the Tree-Id and the RCB taken together.

If the rule mesh traversal is not over, then at step 321, the type of change in the expression category is determined. For example, while the rule engine traverses from a path node P1 to another path node P2; P1 may be a session-based node and P2 may also be session-based node; P1 may be session-based node and P2 may be a control-based node; P1 may be a session-based node and P2 may be a data-based node; P1 may be a control-based node and P2 may also be a control-based node; P1 may be a control-based node and P2 may be a data-based node or P1 may be a data-based node and P2 also a data-based node.

Subsequently, at step 323, the control set of the session entry or the data set of the session entry is updated as per the following criteria.

For the rule engine to update the start node for a session in a data set, the rule engine needs to determine the transition from session-based nodes to data-based nodes or from control-based nodes to data-based nodes. By updating the data set, traversal for subsequent packets is required only for the data-based nodes, thereby skipping the session-based nodes and control-based nodes that do not often change values within the session.

Similarly, the rule engine stores the start node in a control set for a session. For this purpose, the rule engine needs to determine the transition from session-based nodes to control-based nodes or from session-based nodes to data-based nodes. When Application Decode Module sends a control signal, the rule engine starts traversal from start of control-based nodes, as the values of packets for these nodes might have changed.

Thus, for subsequent packet of a session, rule engine starts traversal from the start node of data-based nodes. Where the Application Decode Module sends a control packet, the rule engine starts traversal from the start node of control-based node stored in the session entry.

Finally at step 325, node P1 is set as node P2 and the whole process is repeated again till end of traversal.

In a preferred embodiment of the present invention, a path node table stores the different tree and graph nodes of the rule mesh. The rule engine starts processing at a root path node, which is the first row of this table. Each path node specifies a search address, operation to be performed, location of path edges corresponding to that path node, location and size of operands and also contains two path edges within its structure. The two path edges correspond to the most often-occurring path edges. The values of RCB and GTB corresponding to these path edges are also stored in the path node. The rule engine first does a comparison of current values of the expression against the values stored in the path nodes to check if it could take any of the two path edges stored in the path node. If it finds a match, it does not need to do a search to retrieve the next path edge. This enhances the efficiency of the rule engine. The path edges are stored in a path edge table. For each path edge this table also stores the path node that is arrived at as a result of traversing that path edge. The rule engine uses various search mechanisms to decide the path edge to be taken corresponding to a path node. These search mechanisms have been described in detail later.

Each path node is like a condition element that is evaluated and the result of the evaluation determines the path edge to be taken. For example, a condition might be stated as: If Protocol_ID is 2 then edge 1, if it is 5 then edge 2 and if it is 25 then edge 3. In this case, the Protocol_ID is a value corresponding to a packet, which is taken from the packet extensions and matched against the values of interest namely: 2, 5 and 25. Here Protocol_ID is the operand and 2, 5 and 25 are the values, while the edges are 1, 2 and 3.

Figure 4:
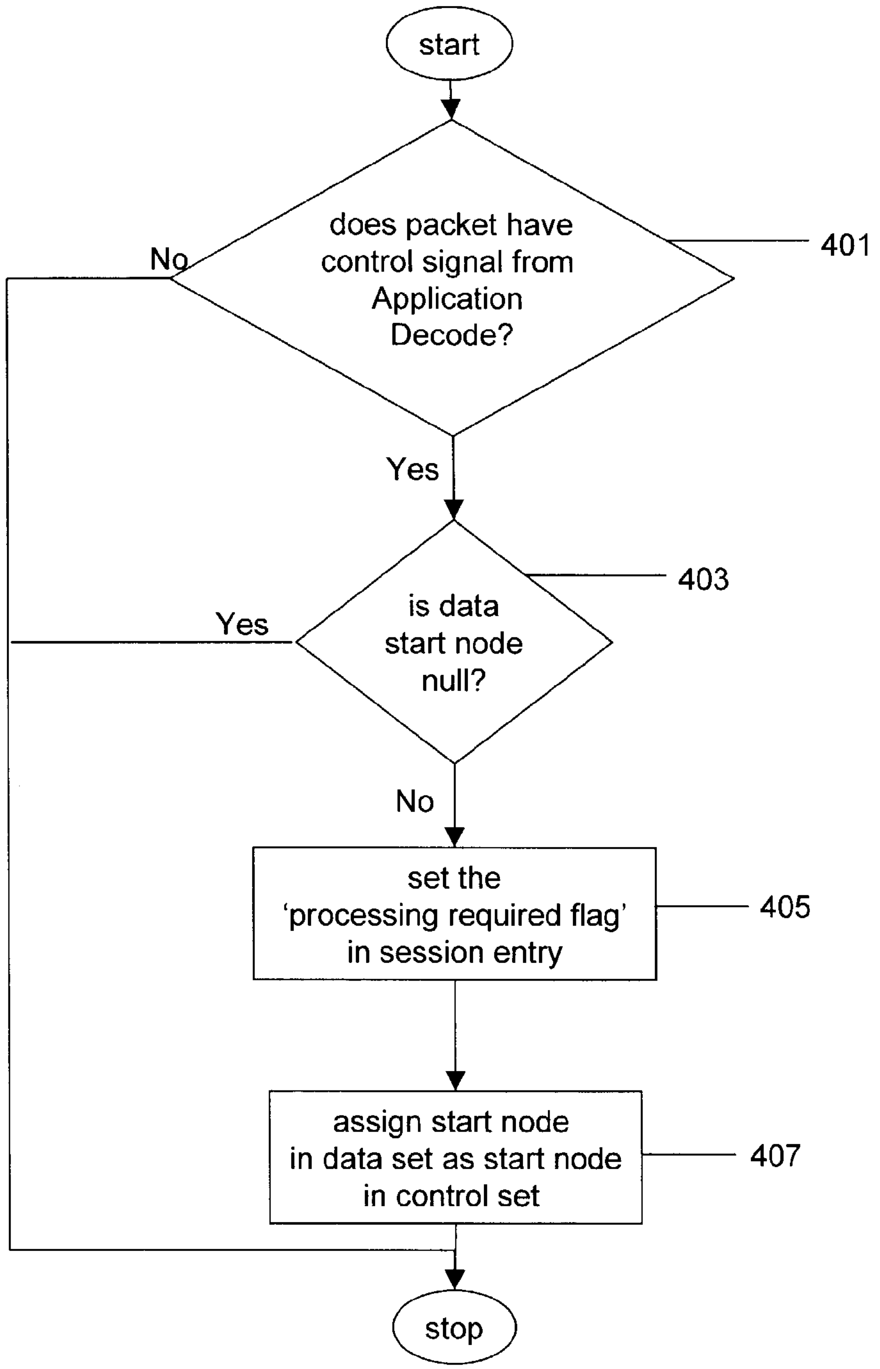
FIG. 4 is a flowchart illustrating actions performed by rule engine on receiving a control signal from Application Decode Module.

FIG. 4 illustrates the action on receiving a control signal from Application Decode Module.

At step 401, a check is made whether a control packet received has a control signal from Application Decode Module. This signal is sent in a control packet by the Application Decode Module. No traversal is done for such a packet; traversal is done only for data packets received.

If a control signal is received, then at step 403, a check is made whether start node in data set of session entry is NULL. If start node is not NULL, then at step 405, a "processing required" flag is set in the session entry. Subsequently, at step 407, start node in data set is set as start node in control set in the session entry. The subsequent packets then start the traversal from the start node in the data set, which is the same as the start node in the control set at that time.

If, at step 403, the start node in the data set of the session entry is NULL, then the rule engine ends processing of the application decode control signal.

Referring back to step 401, if the control packet received does not have a control signal from Application Decode Module, then the rule engine ends processing for the application decode control signal.

FIG. 5 is a table illustrating the actions that the rule engine may perform when it encounters a change in expression categories of two consecutive path nodes P1 and P2.

The rule engine updates the control and data sets in the session entry for pointing to the start nodes from which subsequent packets should start traversal. As the rule engine traverses through the rule mesh, passing from one path node to another, it encounters change in the expression categories of the path nodes. For example, two consecutive path nodes P1 and P2 may have different expression categories, where P1 is a session-based node and P2 is a control-based node. This change in expression categories occurs as path nodes that exist in a given path depend on the created rule mesh and the conditions comprised in the rules. For example, in a rule mesh, the nodes denoting rules may use only 3 conditions, namely: SRC-IP, L4-PROTOCL and Application-Pattern. The first two conditions are session-based conditions and the third is a data based condition. The rule mesh created out of these nodes would have the src-ip, followed by I4-protocol, followed by application-pattern. As the rule engine traverses from I4-protocol to application-pattern, it is traversing from a session-based node to a data based node.

The rule engine uses various search mechanisms to look up the path node and path edge tables. It would be evident to one skilled in the art that there can be numerous ways of doing the same. Some of these search mechanisms are briefly described below.

Integer match search: There are three different types of searches in this category. They are sequential integer match, hashed integer match and indexed integer match. In sequential integer match search, all the possible values are laid in an array and the search algorithm compares the value to the possible values one after another. The match also gives the edge to be taken. Hashed integer match compares the integers, one nibble at a time, for faster convergence. Whereas, the indexed integer match uses the value of the operand as an index into an array and the index provides the edge to be taken.

String compare search: The string compare algorithm follows a simple hash and brute force string compare, very similar to the hashed search. The first eight characters of the string are taken to hash into a hash table and the resulting address either points to another hash entry for string search or to a string entry, wherein the string compare is then done a character at a time.

Pattern match search: This search is used when a set of patterns ('n' patterns) are given, and the problem is to find out if one or more than one of these patterns exist in a text. This can be done by using Brute Force Pattern Match search. This involves creating a window of the size of the smallest pattern in the list of patterns and positioning it in the beginning of the text. Subsequently, strings are compared to check if any of the patterns in the list match, within that window. The window is stretched to accommodate the largest string in the window and then the window is continuously moved by one character at a time. At each position, matching is done against the patterns to check if any of the patterns match.

In a preferred embodiment of the present invention following mechanism is used to search.

String comparison is optimized using a Trie implementation to converge on a string match faster, while the window-shift is improved from the current shift of one character to shift for more characters at using a modification of the Boyre-Moore algorithm.

In the Boyre-Moore algorithm for pattern matching, the basic idea is to be able to shift the window more than one character as is done in the Brute-Force algorithm. This algorithm pre-computes the shift information about the patterns, which is then used to skip some number of characters in the text. The following example can be considered as an illustration of the algorithm. To compute the skip table for the patterns: 'hello', 'window' and 'salute', the algorithm used to compute the skip values is described below.

An array of Skip values corresponding to each ASCII character is created. This array is indexed by the ASCII value of the character.

The skip values for all characters are initialised with the string length of the smallest pattern in the list of patterns; in the current example this would be 5 (the size of "hello").

For each pattern in the list the following steps are repeated:

For each character in the pattern, the skip-value is computed as the distance of the first occurrence of the character, when going from the last character to the first character, from the last character of the pattern. So the shift value for 'I' would be 1, while the shift character for 'e' would be 3. This skip-value is updated in the Array of Skip-Values for that character, if the skip-value in the array is bigger than that just computed.

Figure 6:
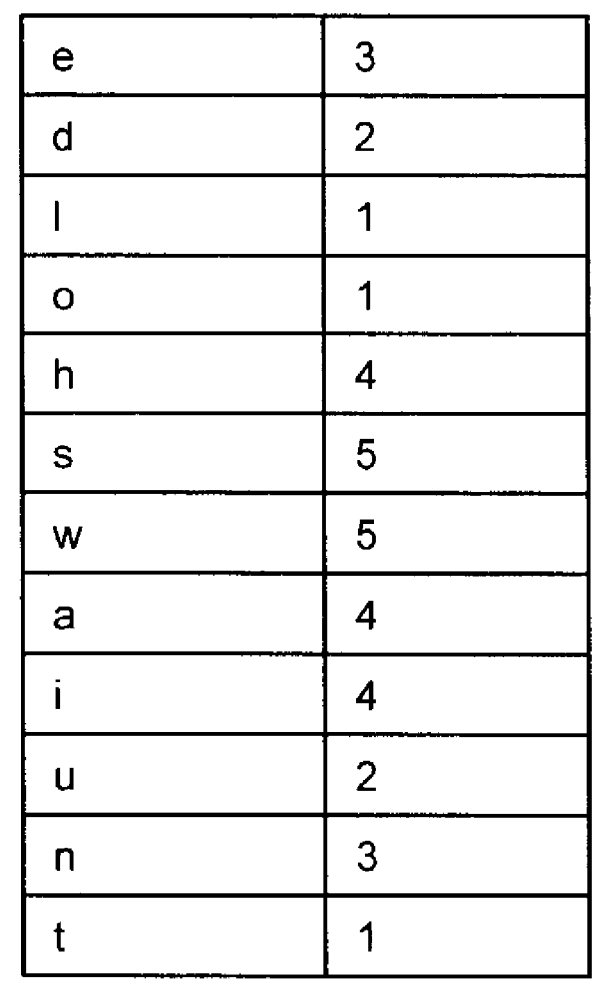

The skip value computed from using the above algorithm is shown in FIG. 6.

The skip values for all characters, not shown in FIG. 6, would remain 5.

If the text in which pattern match is to be done is "She said hello to him". The pattern match algorithm would follow the sequence described below.

Place a window around "She s" and do a string compare against the patterns. The string match fails to match any pattern. Take the skip value corresponding to the last character in the window, which is 's'. The skip value corresponding to 's' is 5. Skip 5 characters.

The window scrolls around "said h", as 'h' is 5 characters from 's'. Note that the window also stretches to be as big as the largest pattern. The string match fails to match any pattern. Take the skip value corresponding to the last character in the window, which is 'h'. The skip value corresponding to 's' is 4. Skip 4 characters.

The window scrolls around "hello", as 'o' is 4 characters from 'h'. The string match succeeds to find hello. Note that the string comparison is done from the end of the window towards the beginning. A match is found.

Figure 7:
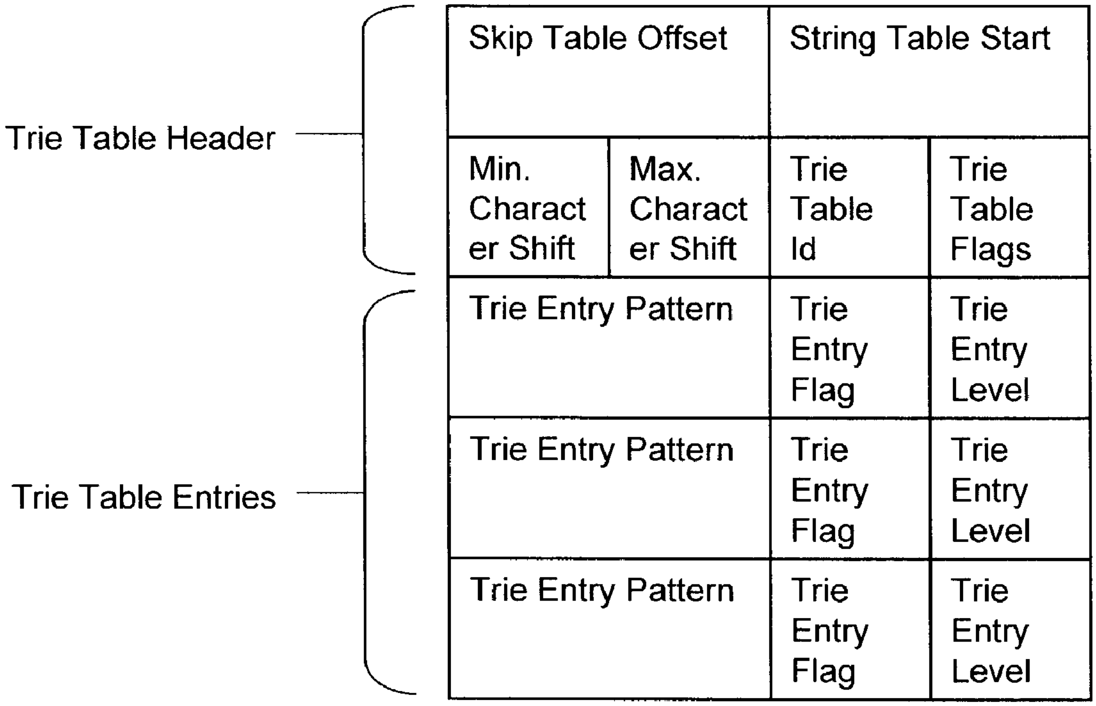
FIG. 7 is a table illustrating the multi-level Trie for string compare.

Once a window is placed around given part of the text, as described above, the next task is to do a string compare against all the patterns, to verify if any of the patterns exists. For this a multi-level Trie structure is used. This structure facilitates faster convergence of the string match against the given patterns. The string comparison logic starts traversing the trie structure from the top two characters at a time. It continues comparing the trie characters consecutively until it reaches the end of the trie given in the 'Trie Entry Flag'. If at any trie match, the two characters actually match, the "level" field gives the next trie record to access to check the next match. This way trie comparison eliminates the strings that do not match. Finally when the strings left are narrowed down to one, a simple string match is done. The string is stored at the offset pointed by the level from the start of the string table kept in the header of the Trie table. This is illustrated in FIG. 7. While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for traversing a rule mesh for evaluating a data packets against rules, the rule mesh being a combination of a tree data structure and a graph data structure, the rules being configured in the rule mesh as path nodes and path edges, the method comprising:
- a. receiving the data packet;
- b. determining a root path node for the data packet;
- c. performing rule mesh traversal for the data packet, wherein the rule mesh traversal starts from the root path node; and
- d. updating information in the data packet during the rule mesh traversal, wherein the information is data regarding the rules satisfied by the data packet.

2. The method as recited in claim 1, wherein the step of determining the root path node comprises checking the data packet for a session based application.

3. The method as recited in claim 2, wherein the step of checking the data packet for the session based application comprises:
- a. checking for the presence of a session create flag if the data packet is for the session based application, wherein the session create flag indicates that the data packet is a first data packet of the session based application; and
- b. assigning the root path node as the node for start of the rule mesh traversal if the data packet is not for the session based application.

4. The method as recited in claim 3, wherein the step of checking for the presence of the session create flag comprises:
- a. initializing a session entry if the session create flag is present, wherein the session entry is used for determination of the root path node; and
- b. retrieving the session entry if the session create flag is not present.

5. The method as recited in claim 1, wherein the step of performing the rule mesh traversal comprises:
- a. traversing the tree data structure of the rule mesh till a start of graph path node is reached, wherein the start of graph path node indicates the start of the graph data structure in the rule mesh;
- b. traversing the graph data structure of the rule mesh when the start of graph path node is reached; and
- c. appending a rule lookup-id to the data packet after the rule mesh traversal, wherein the rule lookup-id contains data pertaining to the rules matched during the rule mesh traversal.

6. The method as recited in claim 5, wherein the step of traversing tree data structure of rule mesh comprises:
- a. determining a root node for the tree data structure, wherein the root node is a start node for traversing the tree data structure;
- b. determining a tree edge for traversing the tree data structure, wherein the step of determining the tree edge comprises performing a search indicated on the root node;
- c. arriving at a next path node of the tree data structure by traversing along the tree edge;
- d. iteratively repeating steps b and c until the next path node is not the start of graph path node, wherein the start of graph path node is a first node of the graph data structure in the rule mesh; and
- e. retrieving a tree ID from the tree edge if the next path node is the start of graph path node.

7. The method as recited in claim 5, wherein the step of traversing the graph data structure comprises:
- a. updating a Rule Confirmation Bitmap (RCB), wherein the RCB indicates the rules matched in the graph data structure;
- b. initializing a Graph Traversal Bitmap (GTB), wherein the GTB indicate conditions governing end of the traversal of the graph data structure;
- c. determining a graph edge for traversing the graph data structure based on the RCB and the GTB;
- d. arriving at a next path node of the graph data structure by traversing along the graph edge; and
- e. ending the rule mesh traversal if at least one of the conditions governing end of the traversal of the graph data structure is satisfied.

8. In computer data processing apparatus an instruction set for traversing a rule mesh for evaluating a data packets against rules, the rule mesh being a combination of a tree data structure and a graph data structure, the rules being configured in the rule mesh as path nodes and path edges, the instruction set comprising:
- a. computer readable instruction means for receiving the data packet;
- b. computer readable instruction means for determining a root path node for the data packet;
- c. computer readable instruction means for performing rule mesh traversal for the data packet, wherein the rule mesh traversal starts from the root path node; and
- d. computer readable instruction means for updating information in the data packet during the rule mesh traversal, wherein the information is data regarding the rules satisfied by the data packet.

9. The instruction set as recited in claim 8, wherein the means for determining the root path node comprises computer readable instruction means for checking the data packet for a session based application.

10. The instruction set as recited in claim 9, wherein the computer readable instruction means for checking the data packet for the session based application comprises:

a. computer readable instruction means for checking for the presence of a session flag if the data packet is for the session based application, wherein the session create flag indicates that the data packet is a first data packet of the session based application; and b. computer readable instruction means for assigning the root path node as the node for start of the rule mesh traversal if the data packet is not for the session based application.

11. The instruction set as recited in claim 10, wherein the computer readable instruction means for checking for the presence of the session create flag comprises:

a. computer readable instruction means for initializing a session entry if the session create flag is present, wherein the session entry is used for determination of the root path node; and b. computer readable instruction means for retrieving the session entry if the session create flag is not present.

12. The instruction set as recited in claim 8, wherein the computer readable instruction means for performing the rule mesh traversal comprises:

a. computer readable instruction means for traversing the tree data structure of the rule mesh till a start of graph path node is reached, wherein the start of graph path node indicates the start of the graph data structure in the rule mesh;

b. computer readable instruction means for traversing the graph data structure of the rule mesh if the start of graph path node is reached; and c. computer readable instruction means for appending a rule lookup-id to the data packet after the rule mesh traversal, wherein the rule lookup-id contains data pertaining to the rules matched during the rule mesh traversal.

13. The instruction set as recited in claim 12, wherein computer readable instruction means for traversing tree data structure of rule mesh comprises:

a. computer readable instruction means for determining a root node for the tree data structure, wherein the root node is a start node for traversing the tree data structure;

b. computer readable instruction means for determining a tree edge for traversing the tree data structure by performing a search indicated on the root node;

c. computer readable instruction means for arriving at a next path node of the tree data structure by traversing along the tree edge;

d. computer readable instruction means for iteratively repeating steps b and c until the next path node is not the start of graph path node, wherein the start of graph path node is a first node of the graph data structure in the rule mesh; and e. computer readable instruction means for retrieving a tree ID from the tree edge if the next path node is the start of graph path node.

14. The instruction set as recited in claim 12, wherein the computer readable instruction means for traversing the graph data structure comprises:

a. computer readable instruction means for updating a Rule Confirmation Bitmap (RCB), wherein the RCB indicates the rules matched in the graph data structure;

b. computer readable instruction means for initializing a Graph Traversal Bitmap (GTB), wherein the GTB indicate conditions governing end of the traversal of the graph data structure;

c. computer readable instruction means for determining a graph edge for traversing the graph data structure based on the RCB and the GTB;

d. computer readable instruction means for arriving at a next path node of the graph data structure by traversing along the graph edge; and e. computer readable instruction means for ending the rule mesh traversal if at least one of the conditions governing end of the traversal of the graph data structure is satisfied.

* * * * *